Sept. 3, 1957 S. M. DOBROSSAVLYEVITCH 2,804,859
MONOVALVE DIESEL ENGINE WITH AIR COOLING
Filed Feb. 15, 1955
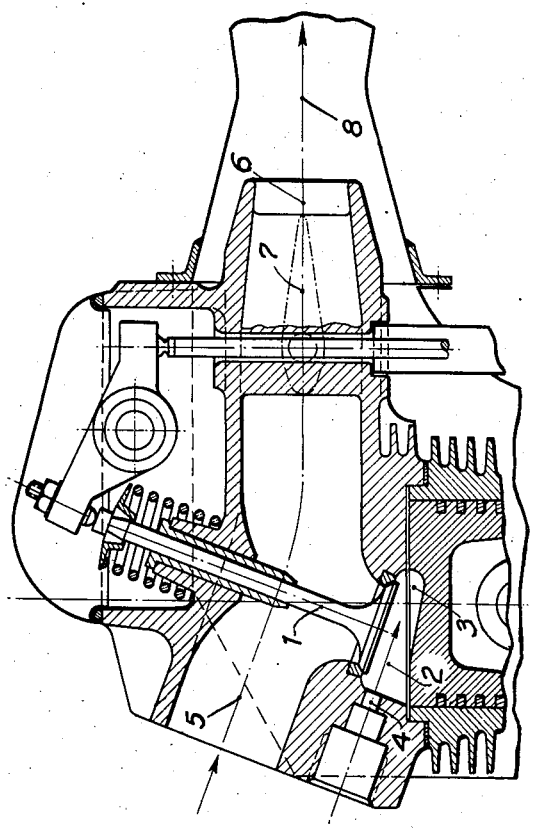
Inventor:
Slobodan M.
Dobrossavlyevitch
by: J. Delatti-Seguy
Attorney United States Patent Office 2,804,859
Patented Sept. 3, 1957

2,804,859

MONOVALVE DIESEL ENGINE WITH AIR COOLING

Slobodan M. Dobrossavlyevitch, Belgrade, Yugoslavia

Application February 15, 1955, Serial No. 503,943

Claims priority, application Yugoslavia February 15, 1954

3 Claims. (Cl. 123—32)

The invention refers mainly to a new design conception of the cylinder head of an aircooled four-stroke diesel engine which—in comparison with existing designs—ensures substantial improvements in reliability, engine life, specific weight and economics of production, and thus also in respect to general suitability of this engine system for all kinds of automotive and light stationary applications.

Besides the obvious advantages in principle of aircooling versus water cooling, the diesel engine designs up to now, intended for automotive or light stationary service, comprise some very serious conceptual deficiencies limiting their further rational development and broader application. Among these defaults the most weighty are: difficult conditions of thermal unloading of the cylinder head and unsuitability of the system for achieving satisfactory combustion at higher engine speeds.

The new design conception of the cylinder head—cf. the enclosed drawing—comprises only a single valve 1 per cylinder, for both exhaust and intake of the cylinder, located in the combustion chamber. This automatically ensures not only conditions of excellent thermal unloading of the valve and combustion chamber but also increases the mechanical reliability and cheapens production and reduces engine maintenance costs.

In order to make these, in principle, advantageous features of the monovalve system compatible with other important requirements, the valve 1 is inclined with respect to the cylinder axis in the direction of the flow of gases, in the plane of symmetry of the cylinder head. The location of the combustion chamber near the periphery of the cylinder serves the same purpose.

The combustion chamber is composed, mainly, of: a cavity in the cylinder head in the form of a truncated circular cylinder coaxial with the valve axis 2 and a corresponding truncated cylindrical cavity in the piston head in the form of a horseshoe 3, where the fuel is injected in the direction of the airflow from the engine air fan (not shown). Fuel injection is in a conical jet through the orifice 4 by means of a standard injector located in the plane of symmetry of the cylinder head and inclined under an angle with respect to the normal plane of the cylinder axis. This combination of the location of the valve, location of the injector and form of the combustion chamber enables—by the airflow effect from the narrowed space between the plane of the head and the piston top into the chamber at the end of compression—the atomization of the fuel spray and the formation of a double vortex, bringing about conditions favourable for an efficient contact of the oxygen with the fuel molecules. Besides, the main manifold channel of the cylinder head—whose geometric axis intersects the cylinder axis thus defining the plane of symmetry of the head—is of such a shape that the intake manifold 5 of the air coming from the engine air fan, inclined with respect to the plane normal to the cylinder axis, gradually merges after the mouth of the valve into the nozzle 6, whose axis is normal to the axis of the cylinder, with progressively contracting cross sections towards the exit. In the plane of symmetry of the cylinder head there is a vane of airfoil section 7 spanning the nozzle 6 forming an organic component part of the head. Through a hole in the vane passes the valve push rod. This form of design of the manifold provides an optimal compromise between airflow conditions of cylinder exhaust and intake on one hand, and other vital design conditions on the other. Finally, within the framework of the new design—by combining the ejector effect of the exhaust gases and of the air left over after the charging of the cylinder from the total quantity supplied by the fan to the manifold—the flow through the nozzle 6 induces a flow of cooling air over the external finned surfaces of the cylinder and cylinder head, by means of suitable baffles and channels.

This conception thus enables, by combining the effect of the fan with the ejector effect of the outflowing gases and air, an efficient total cooling even at high specific engine loadings—a thing by far not attainable by individual solutions.

One should mention that this design conception of the cylinder head makes possible, by its symmetry and overall design simplicity with respect to relief and finning not only a high external cooling effect but also straightforward and cheap production.

Besides, it should be stressed, that this design conception, with one cam per cylinder for the entire distribution, provides much more favourable conditions, both for the exhaust and intake process as well as for the operation of the valve springs, making this system much more adaptable to high speed operation.

Finally, whatever the cylinder arrangement, all cylinder heads are located in such a way that their planes of symmetry are not perpendicular to the geometrical axis of the crank shaft but there are obtuse angles, in the direction of flow, formed by the plane of the main flow through the cylinder head and the direction of the collective intake and exhaust manifold. This not only secures better air distribution and gas collecting conditions but also provides a closer location of the intake and exhaust manifold to the cylinders.

Claim for the protection of the invention:

1. In a monovalve four-stroke air-cooled diesel engine, in combination: a cylinder; a cylinder head; a valve in said cylinder head adapted to control the operation of said cylinder; a combined air inlet and discharge duct in said cylinder head; a fuel injector under said air inlet duct; a combustion chamber communicating with said fuel injector and disposed between the seat of said valve and the top of said cylinder; said air inlet and discharge duct communicating with said combustion chamber when said valve is open; a nozzle at the outlet end of said discharge duct; a venturi ejector connected with said cylinder head and constructed and adapted to cooperate with said nozzle; whereby the air delivered into said air inlet and discharge duct serves for charging and discharging the combustion chamber and the cylinder, and simultaneously for internally cooling the cylinder head and for cooling the cylinder assembly.

2. A diesel engine as claimed in claim 1 in which: the geometric axis of said combined air inlet and discharge duct is in the plane of symmetry of said cylinder head; said inlet duct comprising a straight-line air intake section, the axis of which is inclined angularly with respect to the axis of the cylinder, thereby providing for the location of said fuel injector under said intake section; the axis of said valve being perpendicular to the axis of said air intake section; the axis of said nozzle and venturi ejector being perpendicular to the axis of said cylinder; said combined air inlet and discharge duct merging continually and gradually behind the seat of said valve from said intake section to said nozzle; said valve forming the sole distribution element in said cylinder head.

3. A diesel engine as claimed in claim 2, comprising further a valve actuating mechanism, a valve push rod in said cylinder head near the said nozzle, a vane of airfoil section in the discharge part of said combined inlet and discharge duct and in the plane of symmetry of the cylinder head, and forming a component part of said cylinder head, said vane having a hole adapted to permit the free, thermally protected, passage of said valve push rod.

References Cited in the file of this patent

FOREIGN PATENTS

| | | |
|---|---|---|
| 387,058 | Great Britain | Feb. 2, 1933 |
| 76,498 | Denmark | Oct. 12, 1953 |